United States Patent [19]
Laborde

[11] Patent Number: 5,689,568
[45] Date of Patent: Nov. 18, 1997

[54] MEDIUM ACCESS CONTROL FOR A MOBILE SATELLITE SYSTEM

[75] Inventor: Enrique Laborde, Gaithersburg, Md.

[73] Assignee: Hughes Electronics, Los Angeles, Calif.

[21] Appl. No.: 496,327

[22] Filed: Jun. 29, 1995

[51] Int. Cl.$^6$ ................................................ H04B 7/204
[52] U.S. Cl. ........................ 380/49; 455/12.1; 455/54.1; 370/319
[58] Field of Search ............................ 455/12.1, 54.1; 370/50, 319, 321; 380/49

[56] References Cited

U.S. PATENT DOCUMENTS

| | | | |
|---|---|---|---|
| 4,312,070 | 1/1982 | Coombes et al. | 371/42 X |
| 4,625,308 | 11/1986 | Kim et al. | 370/104.1 |
| 4,628,506 | 12/1986 | Sperlich | 370/104.1 |
| 4,736,371 | 4/1988 | Tejima et al. | 370/95.3 |
| 4,800,561 | 1/1989 | Ishi | 370/104.1 |
| 5,060,266 | 10/1991 | Dent | 380/49 |
| 5,073,900 | 12/1991 | Mallinckrodt | 455/54.1 X |
| 5,084,891 | 1/1992 | Ariyavisitakul et al. | 371/42 |
| 5,172,375 | 12/1992 | Kou | 370/95.3 |
| 5,299,198 | 3/1994 | Kay et al. | 370/95.3 |
| 5,319,712 | 6/1994 | Finkelstein et al. | 380/44 |
| 5,365,585 | 11/1994 | Puhl et al. | 380/49 X |
| 5,448,570 | 9/1995 | Toda et al. | 370/95.3 |
| 5,473,601 | 12/1995 | Rosen et al. | 370/50 |
| 5,546,464 | 8/1996 | Raith et al. | 380/48 |
| 5,551,624 | 9/1996 | Horstein et al. | 244/158 |

*Primary Examiner*—Gilberto Barrón, Jr.
*Attorney, Agent, or Firm*—John T. Whelan; Wanda Denson-Low

[57] ABSTRACT

The present invention provides a medium access control (MAC) layer in a mobile satellite system. The MAC transfers data across the physical channels in the air interface between the mobile terminals, the satellite and the gateways. The MAC of the present invention optimizes for satellite propogation delays and hides the physical transmission media from higher network layers.

14 Claims, 11 Drawing Sheets

MEDIUM ACCESS CONTROL FOR A MOBILE SATELLITE SYSTEM

BACKGROUND OF THE INVENTION

A mobile satellite communication system typically includes at least one satellite, at least one fixed ground terminal, such as a gateway, and many mobile terminals. The mobile terminals typically communicate with the public switched telephone network or other mobile terminals via an air communication interface between the satellite and the gateway. Using the mobile terminals the satellite system can provide a variety of services such as short message service, high penetration paging, fax, data and telephony.

Mobile satellite telephony users demand the same functionality available to users of terrestrial communication services. For example, to implement advanced telephony features such as caller identification, call forwarding, paging and other new subscriber features, a satellite telephony system should share call processing information with terrestrial systems. Providers of terrestrial mobile cellular systems in Europe have established a standard, CCITT Recommendation Q. 1063 (commonly referred to as Groupe Special Mobile or GSM), which allows the compatibility of terrestrial cellular systems. Mobile cellular systems in different GSM countries implementing the GSM architecture allow a GSM mobile cellular terminal from one country to operate in a different GSM service area, possibly in another country. Full roaming capability can thus be achieved. The inter-operability of GSM systems are possible and the various systems may grow and evolve while maintaining compatibility.

Terrestrial standards such as GSM or ISDN, however, cannot simply be directly applied to mobile satellite communication system. The satellite air interface poses physical constraints not presented by terrestrial earth systems. Terrestrial standards do not take into account the satellite air interface and the physical constraints posed by the air interface medium.

Accordingly, there is a need for a device and method that can hide the physical artifacts of the air interface of the mobile satellite system from the higher level services that the communication system must provide. Compatibility with higher level interfaces can thus be implemented.

SUMMARY OF THE INVENTION

The present invention enables a mobile satellite system to implement an common air interface, such as a GSM-like protocol, independent of the particular physical medium. The present invention utilizes a medium access control (MAC) which defines procedures closely associated to the physical layer to allow terrestrial standards to be implemented on the satellite air interface medium. The MAC hides the peculiarities of the physical medium by allowing a uniform interface across different physical medium. Artifacts of the physical medium therefore do not impose requirements on the interface. The MAC enables standards specified for terrestrial systems to be adapted for satellite systems. The terrestrial standards can be maintained while the MAC optimizes for satellite propagation path.

Using the MAC of the present invention enables the implementation of a common air interface independent of the physical medium. Different communication systems can implement the same common air interface, making the systems compatible. A user from one system may then move to another area and communicate with a system implementing the common air interface. Advance calling features are also possible across compatible systems.

Preferably, the MAC of the present invention segments the data into uniform-sized partitions. The MAC then uses a protection mechanism to protect the partitioned data from corruption. Preferably, the data is also encrypted to provide confidentiality. More preferably, the data is interleaved to randomize correlated errors. Most preferred the data is also multiplexing onto the physical transmission media.

The preferred embodiment of the present invention hides the peculiarities of the physical medium by creating a uniform interface independent of the physical transmission media. The invention, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
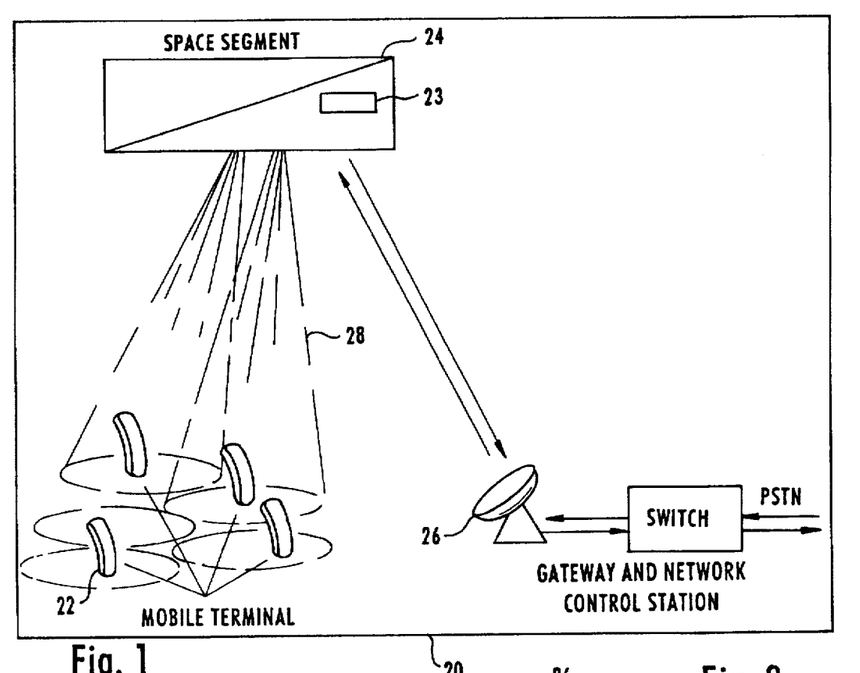
FIG. 1 is a block diagram of a preferred embodiment of a mobile satellite communication system.

Referring now to the drawings, and more particularly to FIG. 1, a preferred embodiment of a mobile satellite communication system 20 is illustrated. The mobile communication system 20 includes at least one mobile terminal 22, at least one space segment 24 such as a satellite, and at least one gateway earth station 26. The mobile terminal 22 is typically either a handheld phone or a vehicle mounted unit. The mobile terminal 22 communicates over an L-band frequency within a particular spot beam 28 with the space segment 24. Each spot beam 28 is associated with a predetermined geographic region.

The gateway 26 communicates with the space segment 24 over a Ku-band frequency. The space segment 24 includes transponders for translating between L-band spot beam signals used by the mobile terminals 22 and the Ku-Band signals used by the gateways 26. The gateway 26—interfaces with a terrestrial telephony carrier, such as the public switched telephone network (PSTN), and may also interface with a cellular network. Thus, a user may place a call on the mobile terminal 22 to either a land line user over the PSTN or to a cellular phone user over the cellular network.

The space segment 24 provides L-band-to-L-band bent pipe single hop communication to support mobile to mobile communication. At the space segment 24, the L-band uplink and downlink are transmitted via multiple spot beams. In the preferred embodiment, small spot size within each spot beam 28 provides the link margins to operate with low power remote terminals 22. In addition, the preferred embodiment provides for frequency reuse so that many, preferably about 16,000, users may be served using a minimum of L-band spectrum. Preferably, the bandwidth of each spot beam 28 can be varied to accommodate changing traffic patterns.

Subscribers to the system have a unique telephone number that allows them to receive calls when they are registered in a space segment 24 coverage area. Registration is automatic when the mobile terminal 22 is turned on. A registration procedure locates the mobile 22 within a particular spot beam 28 coverage area.

In addition to originating calls, the mobile terminal 22 can receive calls from any terrestrial facility by connecting the call through one of the gateway stations 26. At this point, the gateway 26 determines the location of the mobile 22 and sends a message to the mobile terminal 22 to announce the incoming call.

The system 20 utilizes low rate encoded voice transmission. Preferably, some of the mobiles 22 are dual mode, allowing voice communications either via satellite or via the local cellular system. The gateway earth station 26 provides for user mobility as the user's mobile terminal 22 moves from spot beam 28 to spot beam 28.

In addition to the communication channels carried by the space segment 24, some of the space segment resources are used for control functions. In the preferred embodiment, one or more channel in each spot beam 28 are control channels. For example, the gateway station 26 places a forward control signal in each spot beam 28 to allow synchronization of the mobile terminals 22 and to carry network control information from the gateway station 26 to the mobile terminals 22.

The forward control channels allow mobile terminals 22 to acquire a satellite carrier and identify the spot beam 28 and gateway station 26 that originates the signal. The gateway 26 uses the forward control channel to page mobiles 22 using their unique address to announce mobile terminated calls.

Each spot beam 28 preferably contains a return direction signaling channel that mobile terminals 22 use to initiate calls or to register with the gateway 26.

During a call, in-band low data rate control channels are preferably available between the mobile 22 and the gateway 26 for call supervision, power control, and to indicate call termination.

The system 20 contains considerable operational flexibility both from the standpoint of network features and mobile terminal capability. The ground segment facilities include and support features generally categorized as advanced intelligent network (AIN) functionality. In order to support the needs of a business traveler, the switches at the gateway earth stations 26 are configured to provide calling features such as call forwarding, call waiting, call screening, and advanced billing features. In addition, databases in communication with the switch can be configured to generate and maintain user databases to enhance network operation for the user and to facilitate mobility management. Storing and updating user agendas and itineraries are examples.

Figure 2:
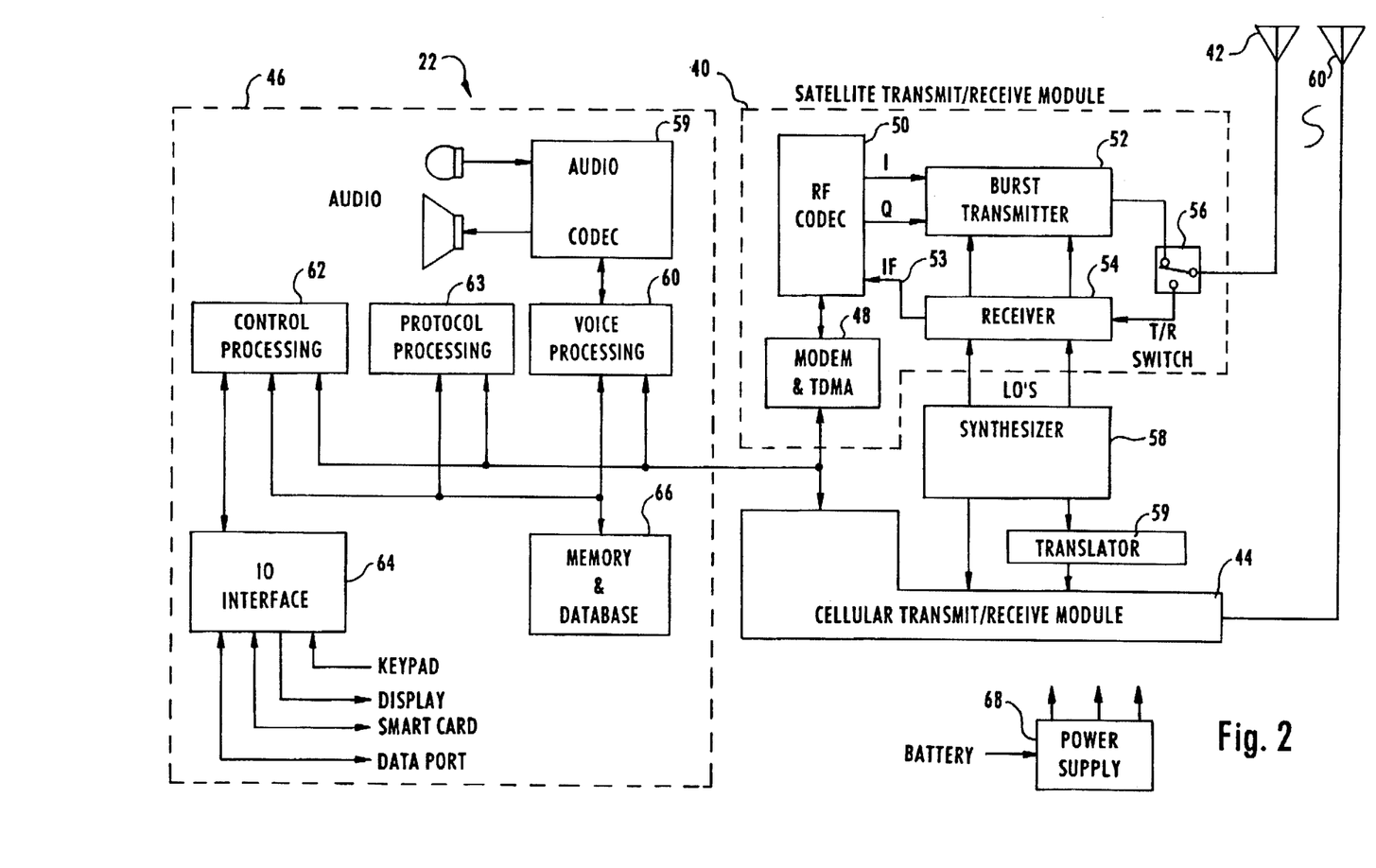
FIG. 2 is a block diagram of a preferred embodiment of a mobile terminal for use in the mobile satellite communication system of FIG. 1.

The presently preferred embodiment of a mobile terminal 22 is shown in FIG. 2. The mobile terminal 22 includes a satellite module 40, a first antenna 42, a cellular module 44, and a user interface module 46. The satellite module 40 is coupled to the user interface module 46, the cellular module 44, and to the first antenna 42. Preferably, the first antenna 42 is a small low power antenna. The satellite module 40 includes a modem and TDMA unit 48, an RF coder and decoder 50, a burst transmitter 52, a receiver 54, and a transmit or receive (T/R) switch 56. In the preferred embodiment, the modem 48 is connected to the RF code 50, and the RF coded 50 is connected to the burst transmitter 52 and to the receiver 54. The T/R switch 56 is connected to the burst transmitter 52, the receiver 54, and the first antenna 42.

Within the satellite module 40, the modem 48 converts speech or data samples to and from channel symbols using quadrature phase shift key modulation (QPSK). The QPSK is preferably performed digitally by an application specific integrated circuit or alternatively a commercially available digital signal processor integrated circuit. The RF code 50 converts channel symbols from the modem 48 into baseband I and Q signals that are transmitted to the burst transmitter 52. In the receive direction, the RF code 50 processes an IF signal 53 from the receiver 54 for input to the modem 48. The RF code is preferably an application specific integrated circuit or alternatively a commercially available digital signal processor integrated circuit.

The burst transmitter 52 converts the I and Q signals from the RF code 50 up to a desired frequency, preferably an L-band frequency, for transmission by the first antenna 42. The burst transmitter 52 is preferably a hybrid RF integrated circuit. The receiver 54 converts a received L-band signal from the first antenna 42 into the IF signal 53 sent to the RF code 50. The receiver 54 is preferably a hybrid RF integrated circuit.

The T/R switch 56 allows the mobile terminal 22 to either transmit data or receive data. Since the preferred mobile terminal 22 does not generally transmit and receive simultaneously, the mobile terminal 22 does not need a large filter to isolate the transmission and reception paths. Many conventional mobile terminals require a diplexor or similar device to perform such filtering. However, conventional mobile terminals 22 with diplexors are more costly, weigh more, and add approximately one-half dB of undesirable insertion loss.

The mobile terminal 22 also includes a synthesizer 58 that provides a fixed local oscillator signal for the RF code 50. The synthesizer 58 includes a variable local oscillator for channel tuning within the satellite module 40 and generates data clocks for the modem 48. In the preferred embodiment, the synthesizer 58 is connected to the receiver 54 and to the cellular module 44.

The user interface module 46 includes an audio and code unit 59, a voice processing unit 60, a controller 62, an input/output (I/O) interface 64, and a memory 66. Preferably, each element within the user interface module 46 communicates with the other user interface elements.

The audio unit 59 digitizes an audio analog signal from a telephone handset (not shown) into a digital 64 Kilobit per second (Kb/s) pulse code modulation (PCM) signal. The audio unit 59 also converts digital PCM signals into an audio signal transmitted to the telephone handset (not shown).

The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art. Both the CELP type and the MBE type encoder produce an output having a voice quality of at least 3.2 MOS. Of course, if an application allows a lower quality voice signal, such as in a military application, even lower rate encoding could be used.

The controller 62 preferably provides a multitasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port, for digital communication such as a facsimile transmission, and a smart card interface as specified in GSM.

The cellular module 44 allows the mobile terminal 22 to communicate with a cellular system over a second antenna 60. The cellular module 44 uses standard components, such as a GSM chip set, known to those skilled in the art. The mobile terminal 22 preferably operates in a first mode where the terminal 22 functions as a conventional cellular phone. In a second mode, the mobile terminal 22 preferably operates so that the mobil terminal 22 communicates with the satellite 24. A battery 68 is provided for portable operation of the mobile terminal 22.

The preferred mobile terminal 22 has many advantages. For example, the mobile terminal 22 provides dual-mode operation, either cellular or satellite. Also, the mobile terminal 22 provides high quality digital voice with a measured MOS score from about 3.2 to 4.0. Further, the mobile terminal 22 allows for paging and messaging, transmission at a 2400 or 4800 bps data rate via the data port, and provides a convenient cellular-like interface. Also, the mobile terminal 22 may transmit on a single channel using a single time slot within a carrier signal allowing many other mobile terminals 22 to transmit over the same carrier. Thus, the mobile terminal 22 efficiently transmits over scarce L-band frequency resources.

Figure 3:
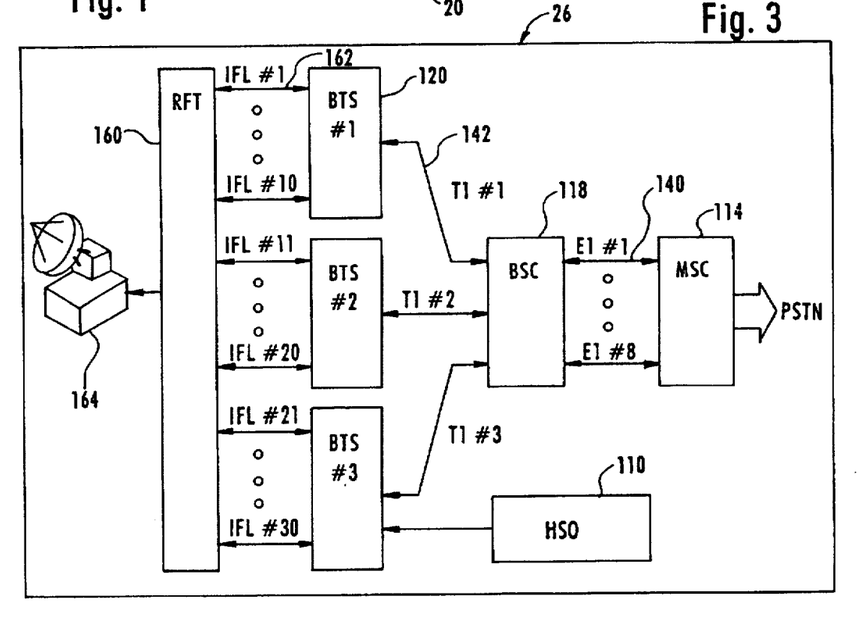
FIG. 3 is a block diagram of a preferred embodiment of a gateway earth station for use in the mobile satellite communication system of FIG. 1.

FIG. 3 is a block diagram of a preferred embodiment of a gateway 26. The gateway 26 includes a mobile switching center (MSC) 114, a plurality of base station controllers (BSCS) 118, a plurality of base transceiver stations (BTS) 120, and a radio frequency unit 160. The MSC 114 allows communication with the public switched telephone network (PSTN) and other mobile switching centers. The MSC 114 is connected, preferably by an A-interface 140 such as a standard E1 or E3 line, with at least one BSC 118. The BSC 118 is connected through a communication channel 142, such as a T1 line, to one or more of the base transceiver stations (BTS) 120. Each BTS 120 may communicate over an RF frequency with a mobile terminal 22.

A telephone "call" may be originated from the mobile terminal 22 by transmitting initialization data up to the space segment 24 over a control channel and then down to the gateway 26. In the preferred embodiment, the control channel is transmitted over a time slot within a frequency assigned to a spot beam 28 having a coverage area surrounding the mobile terminal 22. At the gateway 26, the call is transmitted via an RF channel in the radio frequency unit 160 to the BTS 120 assigned to the spot beam 28 servicing the mobile terminal 22. From the BTS 120, the call is routed to the BSC 118, and then to the MSC 114. From the MSC 114, the call is routed to either the PSTN or another MSC. Thereafter, a communication channel is established through the entire gateway 26, and a subscriber using the mobile terminal 22 may communicate over the established communication channel.

Calls may also originate from either the PSTN or another MSC. Such a call enters the gateway 26 at the MSC 114 and is routed to one of the BSCs 118. The BSC 118 then pages the mobile subscriber 22 via the appropriate BTS 120. After the mobile subscriber 22 responds to the page from the BTS 120, a communication channel is established.

Figure 4:
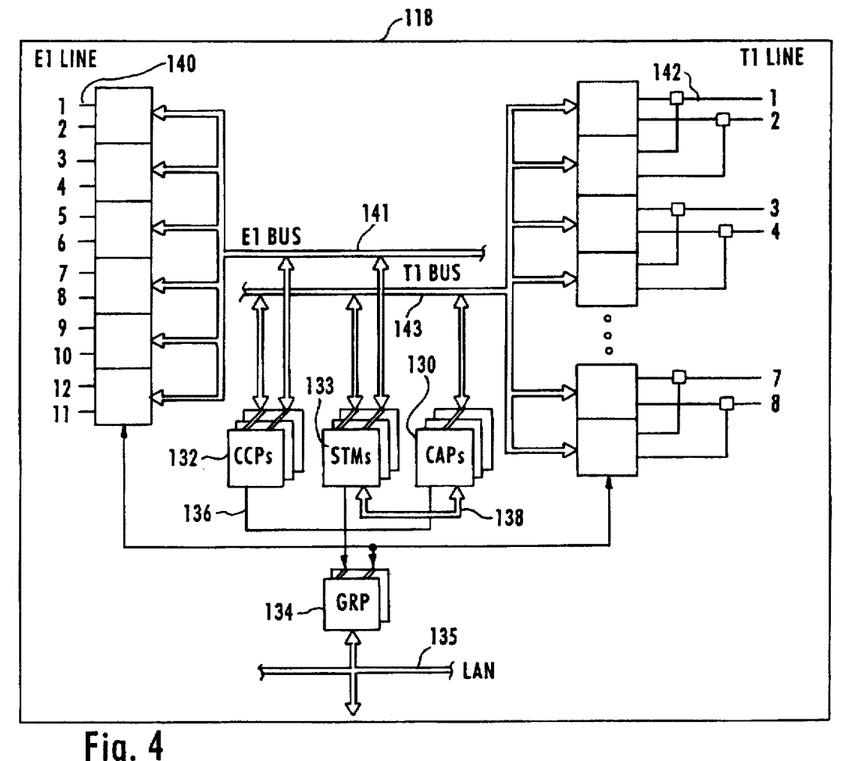
FIG. 4 is a block diagram of a preferred base station controller within the gateway earth station of FIG. 3.

FIG. 4 illustrates a preferred component layout for the BSC 118. The BSC 118 communicates with the MSC 114 over E1 transmission lines 140 and communicates with the BTS 120 over T1 transmission lines 142. The BSC 118 has several processors including a call control processor (CCP) 132, a global resource processor (GRP) 134, and a channel access processor (CAP) 130. The BSC 118 also includes a BSC local area network (LAN) 136 and a VME bus 138. The VME bus 138 is used to communicate between the various CAPs 130, while the LAN 136 allows communication between the CCPs 132.

Each processor (130, 132, and 134) shown in FIG. 4 is preferably a 32 bit microprocessor such as an Intel 960. The processors (130, 132, and 134) are preferably operated with a multitasking software operating system such as UNIX or, most preferably, the VX WORKS operating system available from Wind River Systems.

Each processor (130, 132, and 134) is typically programmed with application software and communication software. Preferably, such software is written in C language or another conventional high level programming language. Each of the processors (130, 132, and 134) communicates with the other processors using either the BSC LAN 136 or the VME bus 138. Preferably, the processors (130, 132, and 134) communicate with each other using a network configuration and communication techniques well-known in the art.

Calls originating from the mobile subscriber 22 are received over the T1 line 142 and processed by the GRP 134. The GRP 134 then determines, based on loading conditions, which CCP 132 should handle the call. The call is then handed off to the selected CCP 132 assigned to the call. The CCP 132 then determines which CAP 130 should be used.

In the case of a call terminating to a mobile subscriber 22, the call originates from the MSC 114 over an E1 line 140 and is then routed to a GRP 134. The GRP 134 allocates a CCP 132, which then allocates a CAP 130.

Figure 5:
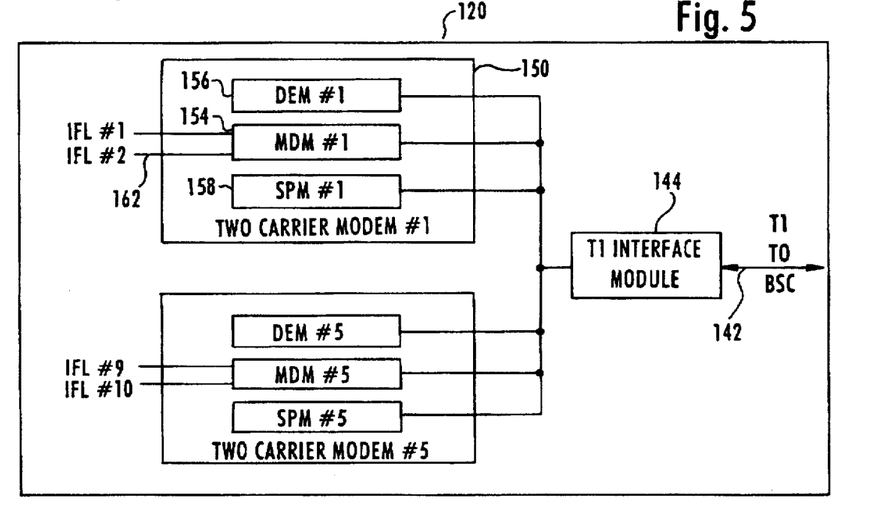
FIG. 5 is a block diagram of a preferred embodiment of a base transceiver station within the gateway earth station of FIG. 3.

FIG. 5 illustrates a block diagram of a preferred component layout for the BTS 120. The BTS 120 communicates with the BSC 118 over a T1 interface module 144 connected to the T1 communication lines 142. A two-carrier modem 150 is connected to the T1 interface module 144 and receives data from the T1 lines 142. The two-carrier modem 150 generates an analog signal over the IFL 162 to communicate with the mobile subscriber 22.

Each two-carrier modem 150 includes a modulator down-converter (MDM) 154, a demodulator module (DEM) 156, and a slot processor module (SPM) 158. The modem 150 receives and synchronizes the data stream sent over the T1 line 142 from the BSC 118. Specifically, the modem 150 extracts and deframes voice traffic from the T1 data stream. The modem 150 also performs baseband processing and transmit filtering of a transmit packet formed from the data stream. The modem 150 modulates, upconverts, and amplifies the processed signals. Preferably, the modem 150 is implemented as an application specific integrated circuit.

Each BTS 120 contains a plurality of communication channels available for transmission. These channels may be control channels, traffic channels, or paging channels. The control channels are used to communicate between the BTS 120 and the mobile terminal 22 before the mobile terminal 22 has been assigned a voice channel for communication. The traffic channel may be used for voice communication between the BTS 120 and the mobile terminal 22. Each traffic channel is associated with a specific predefined frequency and a specific time slot used for radio transmission over the RF communication link 152. In a preferred FDMA/TDMA embodiment, each frequency contains a frame supporting eight time slots where each time slot is associated with a transmission channel.

Figure 6:
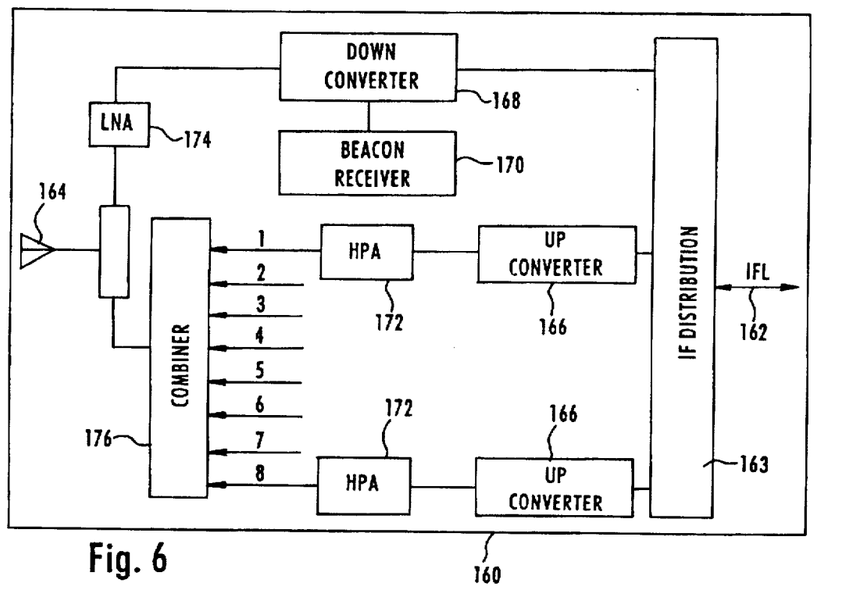
FIG. 6 is a block, diagram of a preferred embodiment of a radio equipment component of the gateway earth station of FIG. 3.

Referring to FIG. 6, a preferred embodiment of the RFT module 160 is shown. The RFT module 160 communicates with the BTS 120 via a plurality of interfacility links (IFL) 162 and communicates with the space segment 24 via an antenna 164. The RFT module 160 preferably includes an upconverter 166, a downconverter 168, a receiver 170 such as a beacon receiver, a high power amplifier (HPA) 172, a low noise amplifier (LNA) 174, and a combiner 176. In the preferred embodiment, the HPA 172 is connected to the upconverter 166 at its input and is connected to the combiner 176 at its output. The LNA 174 is connected to the combiner at its input and is connected to the downconverter 168 at its output. The downconverter is preferably connected to the receiver 170 and the combiner 176 is preferably coupled to the antenna 164.

The upconverter 166 receives a signal from the IFL 162 and converts the frequency of the received signal up to a desired transmission frequency. The HPA 172 amplifies the desired frequency signal produced by the upconverter 166 and transmits the amplified signal to the combiner 176. The combiner 176 multiplexes a plurality of amplified signals into an RF output signal to be transmitted over the antenna 164.

After receiving a signal from the antenna 164, the signal is amplified by the LNA 174, downconverted to an intermediate frequency (IF) signal by the downconverter 168, and detected by the receiver 170. The IF signal is then sent over an IFL 162 to the BTS 120.

The satellite 24 provides congruent beams for transmission and reception. In a preferred embodiment, a first satellite 24 has a coverage region over the continent of Africa and a second satellite covers Asia. Each spot beam 28 covers a predetermined geographic area on the earth's surface. Also, each spot beam 28 includes a predetermined group of frequencies according to a designed frequency reuse plan. In the preferred embodiment, the system uses a seven cell repeating frequency reuse pattern. Thus, the available bandwidth, 10 Mhz for L-band, is divided by seven, so that each spot beam has about 1.43 Mhz of available bandwidth. In the preferred embodiment, a bandwidth of 31 KHz is allocated to each carrier, and eight channels are assigned to each carrier yielding about 258 channel per Mhz or a maximum of about 368 channels per spot beam 28.

Figure 7:
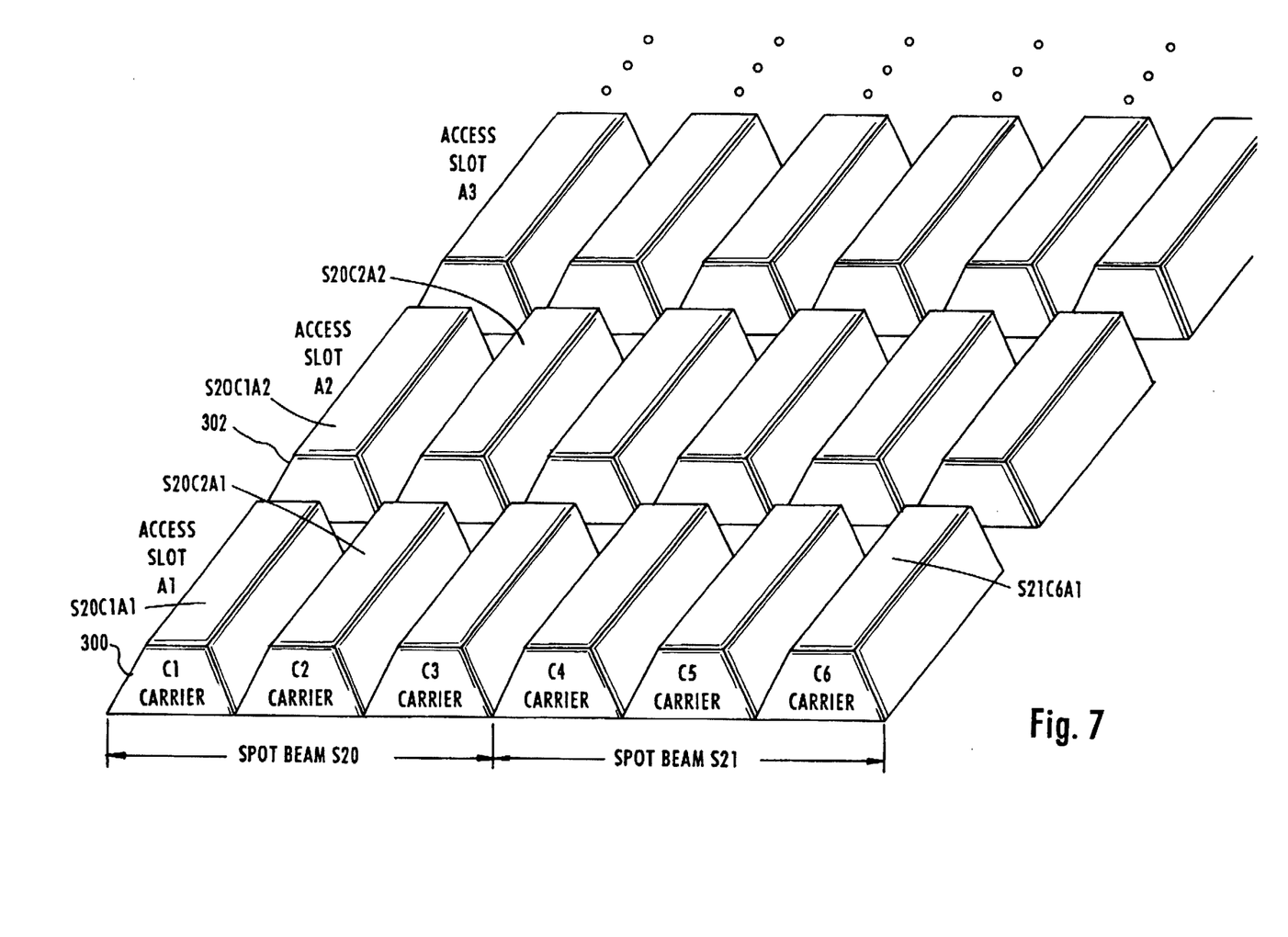
FIG. 7 is a diagram of a preferred embodiment of a frequency reuse plan in the mobile satellite communication system of FIG. 1.

As shown in FIG. 7, each spot beam includes at least one carrier signal 300. Each carrier signal 300 is transmitted over a different frequency, preferably an L-band frequency. Also, each carrier 300 within each spot beam 28 carries a plurality of access slots 302 such as time slots. Thus, a unique communication channel between a mobile terminal 22 and the satellite 24 may be identified by a spot beam number, a carrier number, and a time slot number.

Figure 8:
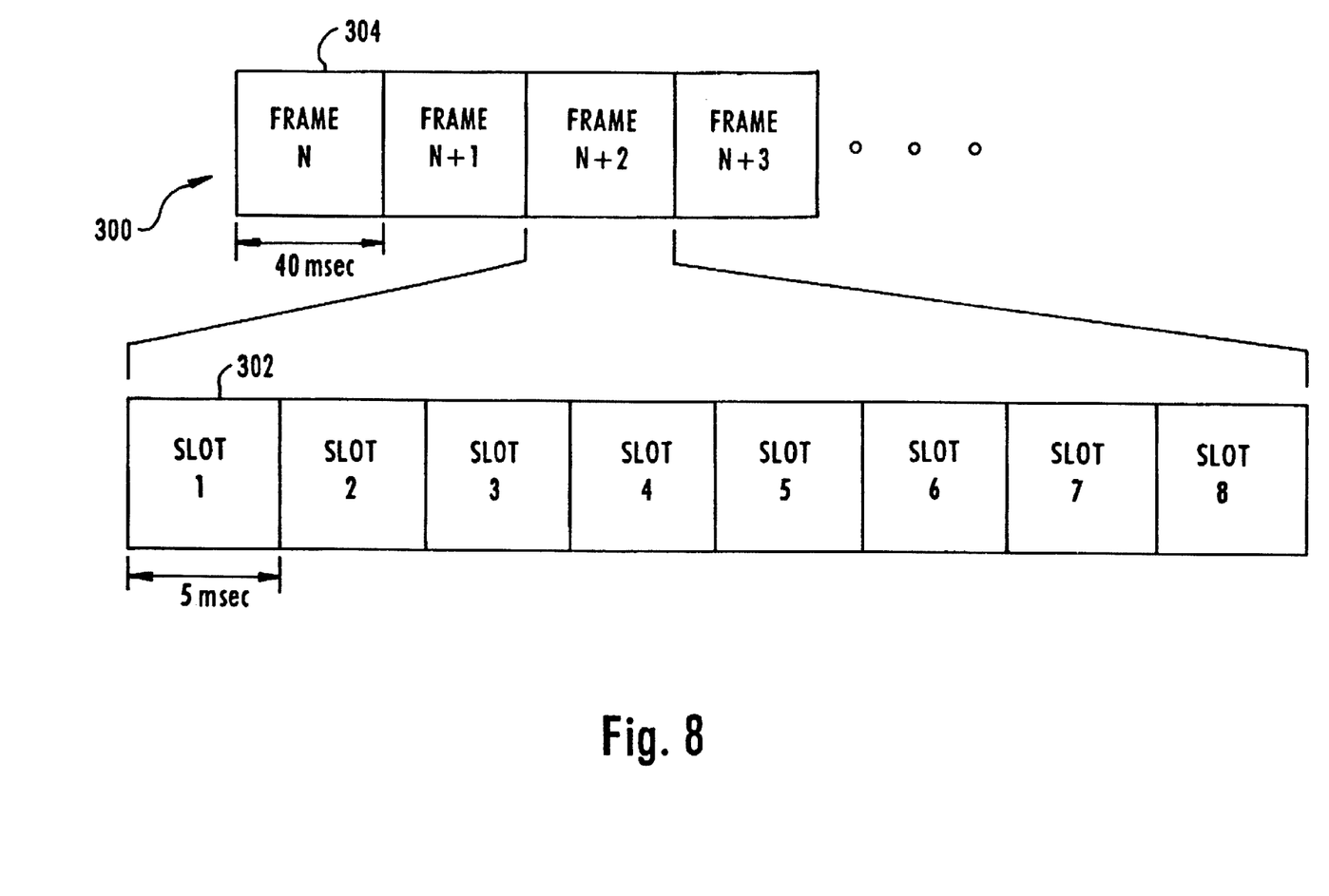
FIG. 8 is a diagram of a preferred embodiment of time slots within a carrier signal transmitted over the mobile satellite communication system of FIG. 1.

Referring to FIG. 8, a preferred carrier signal 300 is divided into a plurality of frames 304. Each frame 304 has a preferred duration of 40 ms. In one preferred embodiment, each frame 304 carries eight time slots 302 and each time slot 302 has a duration of 5 ms.

Figure 9:
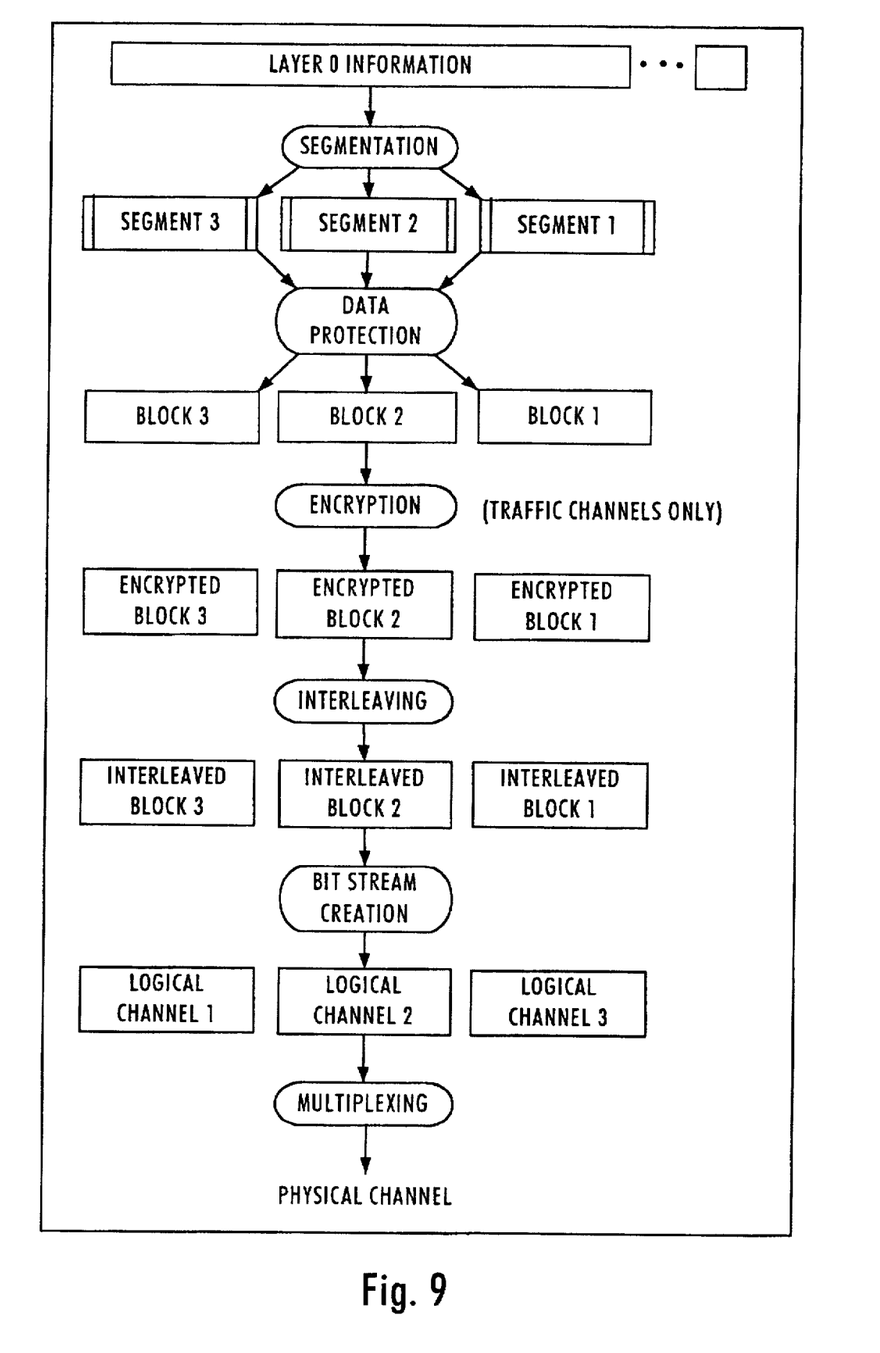
FIG. 9 is a flow diagram illustrating the preferred method of the present invention.

Preferably, the present invention implements a MAC layer to transfer information across the physical channels in the air interface between the mobile terminals, the satellite and the gateways. The steps performed by the MAC sublayer to transfer information across the air interface physical channels are shown in FIG. 9.

The MAC performs the functions of segmentation, data protection, encryption, interleaving, bit stream creation and multiplexing.

Figure 10:
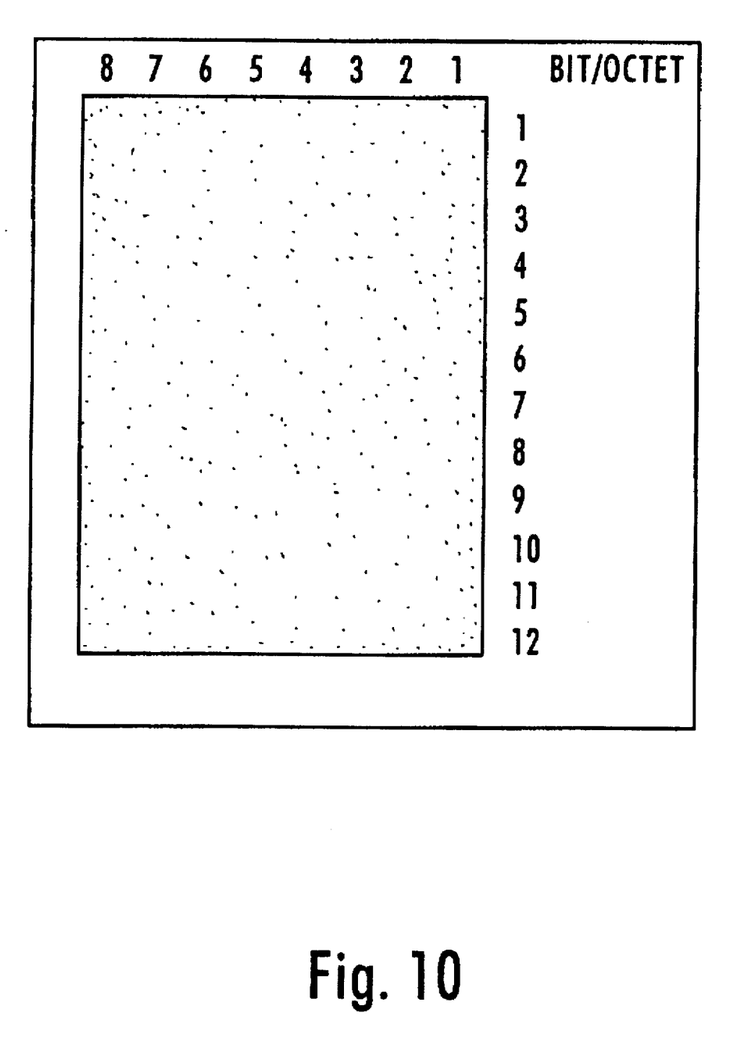
FIG. 10 is a diagram illustrating the preferred uniform MAC segment.

The MAC segments and reassembles information of arbitrary length to fit into the fixed partitions defined at the physical level. Information, whether it be voice or data, may come in any size. Preferably, the MAC organizes all information into a 12-octet (96 bit) MAC segment structure, as shown in FIG. 10.

Bit positions are identified 1 to 8, bit 1 is the most significant and is transmitted first. Octets are identified 1 to 12, octet 1 is transmitted first. When a field extends over more than one octet, the most significant bit of the field is represented by the lowest number bit of the lowest numbered octet.

Variable length information is transmitted over the control channels, and the fast and slow channels of the traffic channels using this fixed length MAC segment structure. In the preferred embodiment, the 12-octet MAC segment is constructed to fit into a 192-bit payload of a TDMA burst after it is encoded with a rate ½ encoding algorithm.

Data protection using several error protection mechanisms is preferably provided to protect control and user information over the air interface. Forward error correction (FEC) to improve the BER in the transmission of control information relative to the raw error rate performance of the channel. All control information transmitted over both traffic and control channels is protected by FEC encoding. FEC encoding of the MAC segments is accomplished with an error protecting extended Golay (24,12) code, this code is a Rate ½ block code obtained by adding an extra parity bit to the 23-bit word in the Golay triple error correcting code. At the transmit side, 96-bit MAC segments are transformed by the Golay (24,12) encoder into 192-bit blocks. At the receive side, the MAC sublayer performs the inverse operation of converting the 192-bit encoded block contained in the payload into a 96-bit MAC segment with the extended Golay decoder. The error correction capability of the extended Golay code improves the error rate of the channel from a nominal raw BER=1.7% to a corrected payload error rate PER=0.47%, or an average of seven payloads in error per minute when the link operates at the nominal $E_b/N_o$ of 5 dB.

Cyclic redundancy check (CRC) detects errors of control at the receive side. In addition to the FEC and CRC protection mechanisms, the transmission of control information over the bidirectional traffic channels is protected by error correction procedures based on ARQ. The MAC layer uses a 16-bit CRC for error detection at the receiver. The CRC generator is the standard CCITT CRC-16 polynomial:

$$x^{16}+x^{12}+x^5+1$$

The receiver calculates the CRC and discards messages where finds a mismatch between the calculated and received CRCs.

In addition to the FEC and CRC protection mechanisms, the transmission of control information over the bidirectional traffic channels is preferably protected by error correction procedures based on ARQ known to those in the art.

Traffic channels are preferably encrypted to provide user data confidentiality over the air interface. Encryption is only applied to point-to-point connections provided by traffic channels. The information sent over the control channels are preferably not encrypted.

Figure 11:
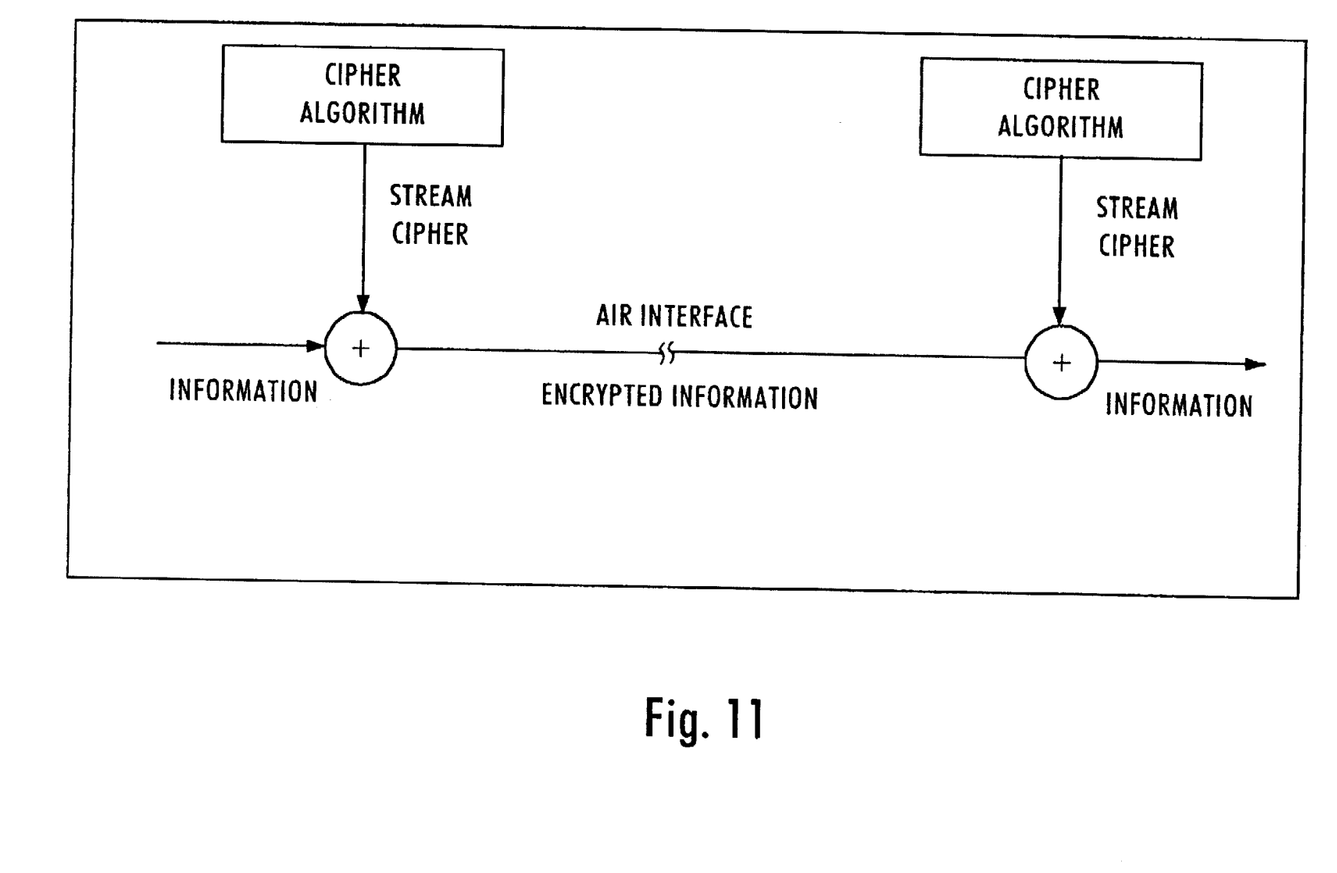
FIG. 11 is a flow diagram illustrating the preferred encryption of the present invention.

Encryption algorithms are well known to skilled in the art. Preferably, encryption is implemented by performing a bit-by-bit module-2 addition (XOR) with a stream cipher and the user data as shown in FIG. 11. At the receive side, the modifications introduced on the information by the stream cipher are removed by XORing the received bit stream with the same stream cipher used at the transmit side. In every frame, the stream cipher algorithm produces 200 encryption/decryption bits numbered $e_1$ to $e_{200}$. Bits $e_1$ to $e_{192}$ are used to encrypt the fast channel, and the 8-bit from $e_{192}$ to $e_{200}$ to encrypt the slow channel. The 192-bit output of the stream cipher are combined by a bit-wise module 2 addition with the 192-bit in the block coming from the FEC encoder.

Interleaving is preferably provided to assist breaking the burst error conditions created by the potential fading environment. Interleaving is intended to preserve the coding gain of the FEC encoder by randomizing correlated errors that might be produced under multipath fading conditions.

To limit the delay introduced by the interleaver, the interleaver memory is preferably limited to the duration of the payload of one burst. The 192-bit interleaver memory is organized in 12 rows by 16 columns rectangular matrix shown in FIG. 12. The columns in the matrix are numbered from 0 to 15 and the bits from 1 to 192, corresponding to their order at the output of the encoder block.

Figure 12:
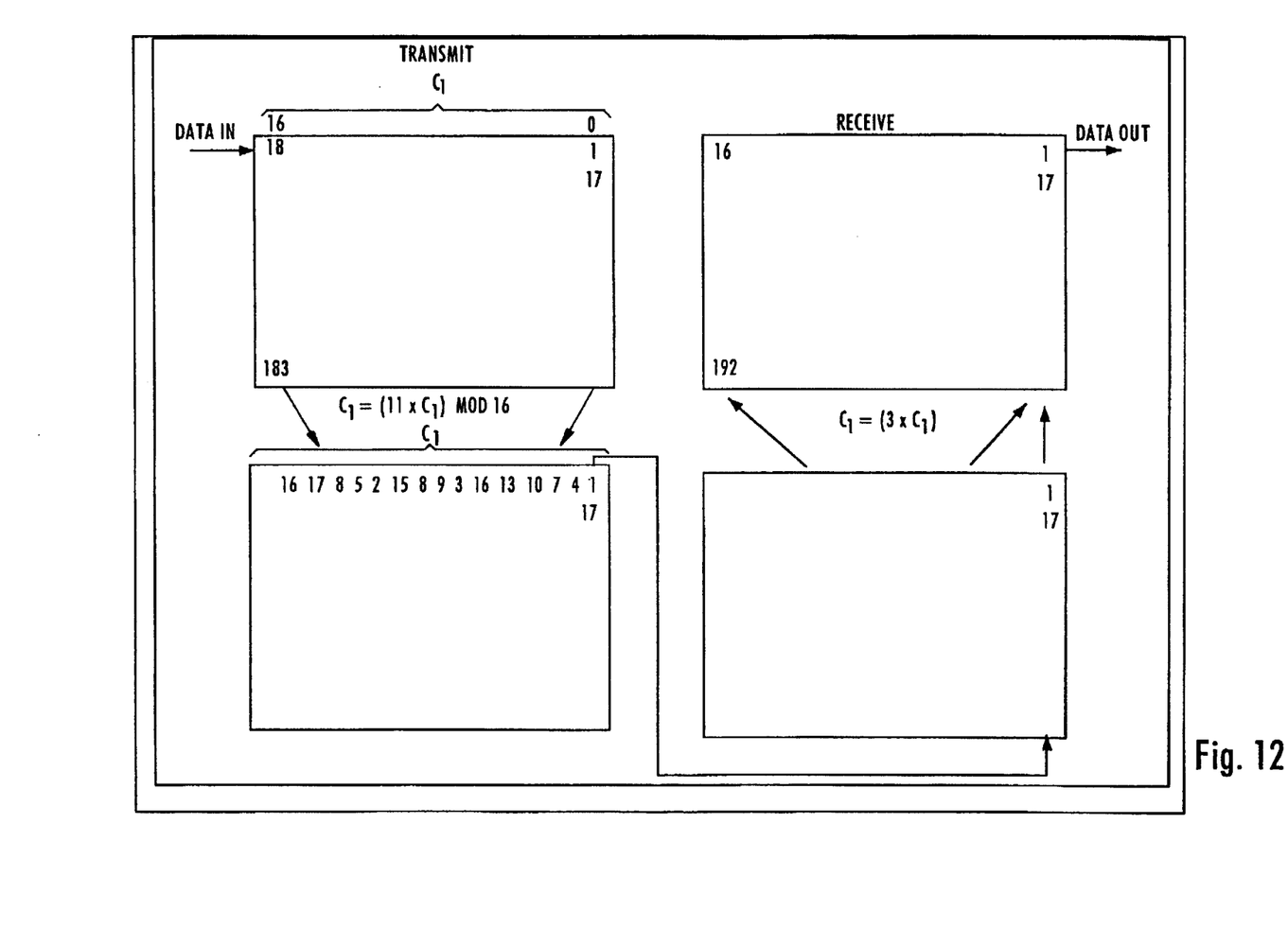
FIG. 12 is a diagram illustrating the preferred interleaving of the present invention.

At the transmit side, 192 bits, including a MAC segment with control information encoded with the FEC, are entered column-wise until all the rows are completed. The columns are then permuted using the algorithm $C_j=(11 \times C_i)_{MOD16}$ and the bits are transmitted row-wise. Each 192-bit block out of the interleaver is incorporated into the payload of a TDMA burst and transmitted during a timeslot. At the receiver, data from the demodulator are entered in the deinterleaver, column by column. The deinterleaver columns are depermuted using the complementary algorithm $C_j=(3 \times C_i)_{MOD16}$ and the data read-out row-by-row.

Preferably, multiplexing is provided to map logical control channels into physical channels. The broadcast control channels (BCCs) are forward physical channels carrying only transmissions from the network to the MTs. Each BCC preferably multiplexes four logical channels: the frequency correction (FCC), the network information channel (NIC), the paging channel (PGC) and a mobile-to-mobile control channel (MMC).

The MAC layer preferably multiplexes these channels by superimposing a multiframe structure over the frame structure defined at the physical level. The multiframe allocates adequate channel capacity to each of the logical channels sharing the BCC capacity. Within the multiplexing structure of the BCC, the logical channels are preferably distinguished by their unique logical channel identifier.

At least one BCC shall be present in each spot beam 28. Preferably, this primary BCC ($BCC_p$) is always transmitted by the network in slot number 0 of the control carrier assigned to the particular spot beam. When the MT power up without knowledge of the spot beam it is in, the MT searches for the strongest $BCC_p$. Once the MT has found the $BCC_p$, it can determine if there are any other BCCs in the spot beam by reading the BCC channel allocation message in the NIC.

If the network transmits two BCCs in a spot beam, the second BCC is preferably assigned to a timeslot number 4 in the same control carrier containing $BCC_p$. When the network transmits more than two BCCs, the assignment of new BCCs becomes a configuration issue and their location is indicated in the NIC.

Figure 13:
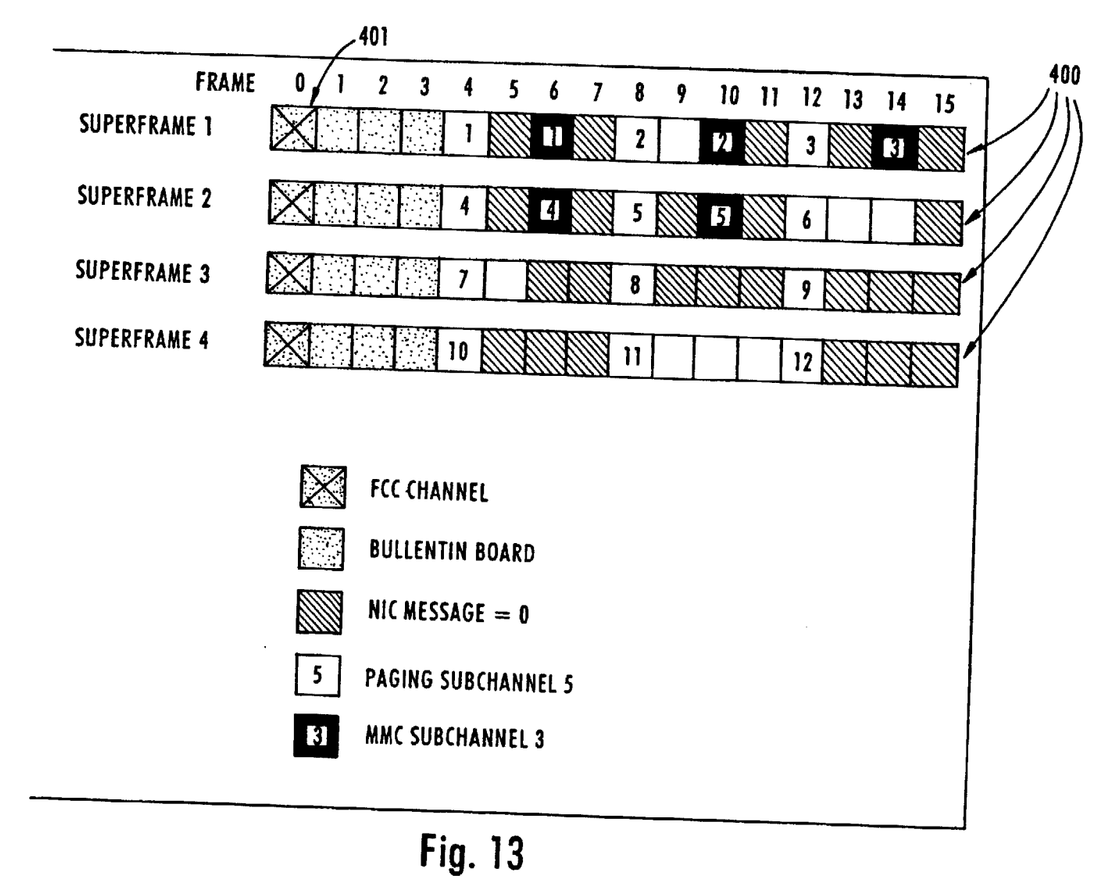
FIG. 13 is a diagram illustrating the preferred superframe structure and multiplexed channel of the present invention.

The FCC, NIC, PGC, and MMC channels are organized in a time-multiplexing scheme over the BCC. Preferably, the basic unit of transmission over the BCC multiplexing structure is the 40 msec frame. Frames are also preferably organized into superframes 400 according to the following rules:

I. The FCC burst is transmitted at the beginning of every superframe 400, as seen in FIG. 13. This frame 401 containing the FCC is designated as frame 0 in the superframe 400.

II. The number of frames 400 in the superframe is not explicitly defined. It is only defined relative to the FCC burst inserted periodically by the network.

III. The number of superframes 400 in the BCC multiplex is 0 to 7.

IV. The position where the NIC, PGC, and MMC are multiplexed within the superframes 400 is shown in FIG. 13 for the case of a multiplex with 4 superframes and 16 frames 401 per superframe.

The preferred rules aiding in the MT in demultiplexing the BCC are the following:

I. The FCC occupies frame 0 of each superframe 400.

II. The length of the superframe 400 needs to be interpolated counting the number of frames between consecutive FCC bursts.

III. Slots 4, 8, . . . (at 4 frame spacing within each superframe) are assigned to the paging subchannels, where each paging subchannel make take up to three consecutive frames. MMC subchannels dynamically assigned by the network according to the mobile-to-mobile call loading in slot 6, 8, . . . of each superframe. The MMC subchannel might take up to two consecutive frames.

IV. Paging subchannel are numbered from 1 up to 255 and are associated with the Group ID of the same number in the Page_ID.

V. The MMC subchannels are numbered from 1 to 255 and are associated with first field of the MMC-ID assigned by the network to each mobile in a mobile-to-mobile call.

VI. The first three slots after the FCC burst 401 are assigned to the high priority Bulletin Board or NIC message #0.

VII. NIC messages distinct from the Bulletin Board do not have a fixed assignment in the frame. These NIC messages occupy any empty frames left by the paging and MMC channels.

The flexible multiplexing scheme has many advantages. FCC bursts may repeat at variable intervals ranging from 280 msec to 1,000 msec. Paging subchannels may be provided at regular intervals to assist mobile terminals in the implementation of power conservation strategies. A variable paging load in each paging subchannel may also be accommodated. Variable capacity PGC and MMC channels may also be provided.

The MAC of the present invention provides an uniform interface for higher level services. The preferred embodiment of the present invention hides the peculiarities of the physical medium by creating a uniform interface independent of the physical transmission media.

I claim:

1. A method of transferring communication data across an air interface between a satellite and a ground terminal, comprising the steps of:

segmenting said communication data into uniform partitions;

protecting said communication data against corruption;

encrypting said communication data for confidentiality;

interleaving said communication data to randomize errors; and multiplexing said communication data with control data into a number of superframes, each of which includes a plurality of frames having a multiplicity of time slots, wherein the control data is located within a particular one of the time slots of each frame and the communication data is located in a different one of the time slots of each frame.

2. The method of claim 1 where the communication data is segmented into 96 bit partitions.

3. The method of claim 1 where the communication data is protected with forward error correction using a Golay code.

4. The method of claim 1 where the communication data is protected with CRC checksum.

5. The method of claim 1 where the communication data is encoded using a bit-by-bit module-2 addition (XOR).

6. The method of claim 1 where the communication data is interleaved into a 12 by 16 matrix.

7. The method of claim 1 where the multiplexing of communication data is onto a RF transmission media.

8. The method of claim 1, wherein the control data includes multiple types of control information and wherein each of the multiple types of control information is located in the particular one of the time slots of a different frame within each superframe.

9. The method of claim 8, wherein a first type of control information is frequency correction data.

10. The method of claim 8, wherein a first type of control information is network information data.

11. The method of claim 8, wherein a first type of control information is paging data.

12. The method of claim 8, wherein one of the multiple types of control information is mobile-to-mobile control data related to sending communication data between two mobile units.

13. The method of claim 1, wherein the ground terminal is a portable terminal.

14. The method of claim 1, wherein the communication data is telephony data.

* * * * *